United States Patent

Sarah

[15] 3,675,502
[45] July 11, 1972

[54] SELECTIVELY MANUAL OR AUTOMATIC SHIFT CONTROL FOR A TWO SPEED DRIVE IN A FISHING REEL

[72] Inventor: Thomas F. Sarah, Akron, Ohio
[73] Assignee: Shakespeare of Arkansas, Inc., Fayetteville, Ark.
[22] Filed: March 8, 1971
[21] Appl. No.: 121,696

[52] U.S. Cl. .............................. 74/369, 74/665 C, 242/213, 242/215, 242/218
[51] Int. Cl. ........................................................ F16h 3/08
[58] Field of Search ....................... 242/213, 215, 218, 219; 74/369

[56] References Cited

UNITED STATES PATENTS

| | | | |
|---|---|---|---|
| 2,240,075 | 4/1941 | Kovalovsky et al. | 242/215 |
| 2,417,732 | 3/1947 | Bland et al. | 242/213 |
| 3,167,272 | 1/1965 | Frode | 242/215 |
| 3,600,964 | 8/1971 | Sarah | 74/369 |

Primary Examiner—C. J. Husar
Attorney—Hamilton, Cook, Renner & Kenner

[57] ABSTRACT

A variable drive for fishing reels, the drive providing high and low speed transmission ratios with either manual or automatic selection therebetween. Each speed ratio has a corresponding gear train operatively connected between a driving and a driven shaft. The two gear trains each have a driving gear carried on the driving shaft. The first and second driving gears mesh with corresponding first and second pinions carried on the driven shaft. The first pinion is connected to rotate only with said driven shaft, but the second pinion is mounted so as to be movable with respect to the driven shaft. A unidirectional clutch means operatively connects the two pinions so that the first pinion can overrun the second pinion but not vice versa. In one embodiment the first driving gear is rotatably carried on, and the second driving gear is affixed to, the driving shaft. In this embodiment a latch means selectively interconnects the first and second driving gears. When the gears are not interconnected by the latch means the ratio of the drive train incorporating the second driving gear is obtained, and when the two driving gears are interconnected the ratio of the drive train incorporating the first driving gear is obtained. In the other embodiment the first driving gear is an assembly having a collar-like hub portion rotatably carried on the driving shaft and a slip-clutch coupler, adjustable for the torque loading at which it slips, operatively connecting the hub portion to a gear portion. As in the first mentioned embodiment, a first latch means is operative between the second driving gear and the gear portion of the first driving gear assembly to control the manual selection of one or the other gear trains. In addition, a second latch means is operative between the second driving gear and the hub portion of the first driving gear assembly to incorporate the slip-clutch coupler within the drive train and thereby establish automatic selection of the transmission ratio in response to retrieval resistance. A cam means coordinately controls the latch means.

15 Claims, 9 Drawing Figures

FIG. 1

INVENTOR.
THOMAS F. SARAH
BY Hamilton, Cook,
Renner & Kenner
ATTORNEYS

FIG. 2

INVENTOR.
THOMAS F. SARAH,
BY Hamilton, Cook,
Renner & Kenner
ATTORNEYS

INVENTOR.
THOMAS F. SARAH
BY Hamilton, Cook,
Renner & Kenner
ATTORNEYS

SELECTIVELY MANUAL OR AUTOMATIC SHIFT CONTROL FOR A TWO SPEED DRIVE IN A FISHING REEL

BACKGROUND OF THE INVENTION

The present invention relates to a variable drive for a fishing reel — particularly to a variable drive that: may be operated automatically to shift between two transmission ratios in response to the resistance encountered during the retrieval of the line; may be operated to provide continuous operation under either transmission ratio; or, may be operated manually to shift between transmission ratios.

By and large most fishing reels have a single transmission ratio. That is, the mechanism by which line is retrieved will recover only a fixed number of coils onto the spool in response to a single revolution of the crank. Although there are other factors that will tend to influence the number of inches of line that will actually be retrieved in response to a single turn of the crank, the length of the line that will be actually retrieved for each turn of the crank depends primarily on the transmission ratio of the gear train that operatively connects the crank to the line spooling mechanism.

In reels having only a single transmission ratio a compromise must be effected between a high speed ratio to afford rapid retrieval, when desired, and a lower speed ratio to afford a more delicate sensitivity when playing a fish. Many times the elected compromise will militate against the fisherman when playing the fish. For example, it has been long known that the line should be maintained taut while playing the fish. The rod accommodates man variations in the movement of the fish in order to allow the fisherman some lag time in which to respond with the proper manipulation of the reel, but when playing fish that are noted particularly for their strength, speed and fighting qualities, the rod and the fisherman's reaction time may not be adequate to maintain the required tautness in the line as, for example, when the fish turns toward the fisherman. This situation epitomizes the desirability that a fishing reel be capable of providing two transmission ratios with means selectively to shift therebetween.

There are also clearly situations where the particular lure being used requires an extremely fast retrieve: to attract the type fish sought; to effect proper action in the lure; or, to maintain the lure at the desired depth. Yet, when a fish is hooked a high speed retrieve may or may not be desirable. Depending upon the particular fisherman, or even the idiosyncrasies of the fish itself, either a manually selective means or an automatic means to change the transmission ratio may be most desirable.

Heretofore, many attempts have been made to provide a two speed transmission for a fishing reel. Most prior known variable speed transmissions for fishing reels limit selection of the speed to a manual operation, as by: a selector device independent of the crank; the direction in which the crank is rotated; or, lateral translation of the crank and driving shaft. Some prior art constructions even provide for automatic shift, but they generally utilize complicated and expensive arrangements — such as planetary heat systems. In my prior, copending application, Ser. No. 16,761, filed Mar. 5, 1970, now U.S. Pat. No. 3,600,964, an extremely simplified construction for providing an automatic shift for a two speed transmission is disclosed, but even that disclosure does not reveal a mechanism by which one may readily elect manual or automatic shift control.

SUMMARY OF THE INVENTION

It is, therefore, a primary object of the present invention to provide a two speed variable drive transmission for fishing reels by which the fisherman is permitted: to preselect either of the transmission ratios; to allow an automatic shifting between the two transmission ratios in response to a predetermined resistance; or, the shift manually between transmission ratios, as the situation of the moment appears to require.

It is another object of the present invention to provide a variable drive, as above, in which the predetermined resistance at which the automatic shift may be effected is adjustable.

It is a still further object of the invention to provide a variable drive, as above, that is relatively inexpensive to manufacture and maintain.

These and other objects of the invention, as well as the advantages thereof over existing and prior art forms, will be apparent in view of the following detailed description of the attached drawings and are accomplished by means hereinafter described and claimed.

In general, a variable drive embodying the concept of the present invention has a driving and a driven shaft connected by two gear trains affording first and second transmission ratios. Each of the gear trains employ a driving gear operatively connected to the driving shaft. The driving gear in the first gear train meshes with a first pinion operatively connected to be rotatable only with said driven shaft, and the driving gear in the second gear train meshes with a second pinion that is mounted on the driven shaft to be movable with respect thereto. A clutch means interconnects said two pinions for unidirectional drive.

In one form of the invention a first driving gear is rotatably carried on the driving shaft and the second driving gear is affixed to the driving shaft. The first driving gear is selectively interconnected to the second driving gear by a manually operated latch means. This embodiment provides only manual selection between the two transmission ratios.

In another embodiment of the invention the first driving gear is an assembly having a collar-like hub that is rotatably carried on the driving shaft, and the collar-like hub is operatively connected to the gear portion of the assembly by a slip-clutch coupler. In this embodiment there are two, manually operated latch means — the first latch means selectively connects the second driving gear to the gear portion of the first driving gear assembly, and the second latch means selectively connects the second driving gear to the collar-like hub portion of the first driving gear assembly.

The relative disposition of the two latch means with respect to the elements they interconnect effects either manual selection of the desired transmission ratio or an automatic shift therebetween in response to a predetermined retrieval resistance. The resistance at which an automatic shift occurs is adjustable, and a unique camming and biasing arrangement coordinately operates the two latch means.

Two alternative embodiments of the subject variable drive are shown by way of example in the accompanying drawings and hereinafter described in detail without attempting to show all of the various forms and modifications in which the invention might be embodied; the invention being measured by the appended claims and not by the details of the specification.

DESCRIPTION OF THE PREFERRED EMBODIMENTS

Figure 1:
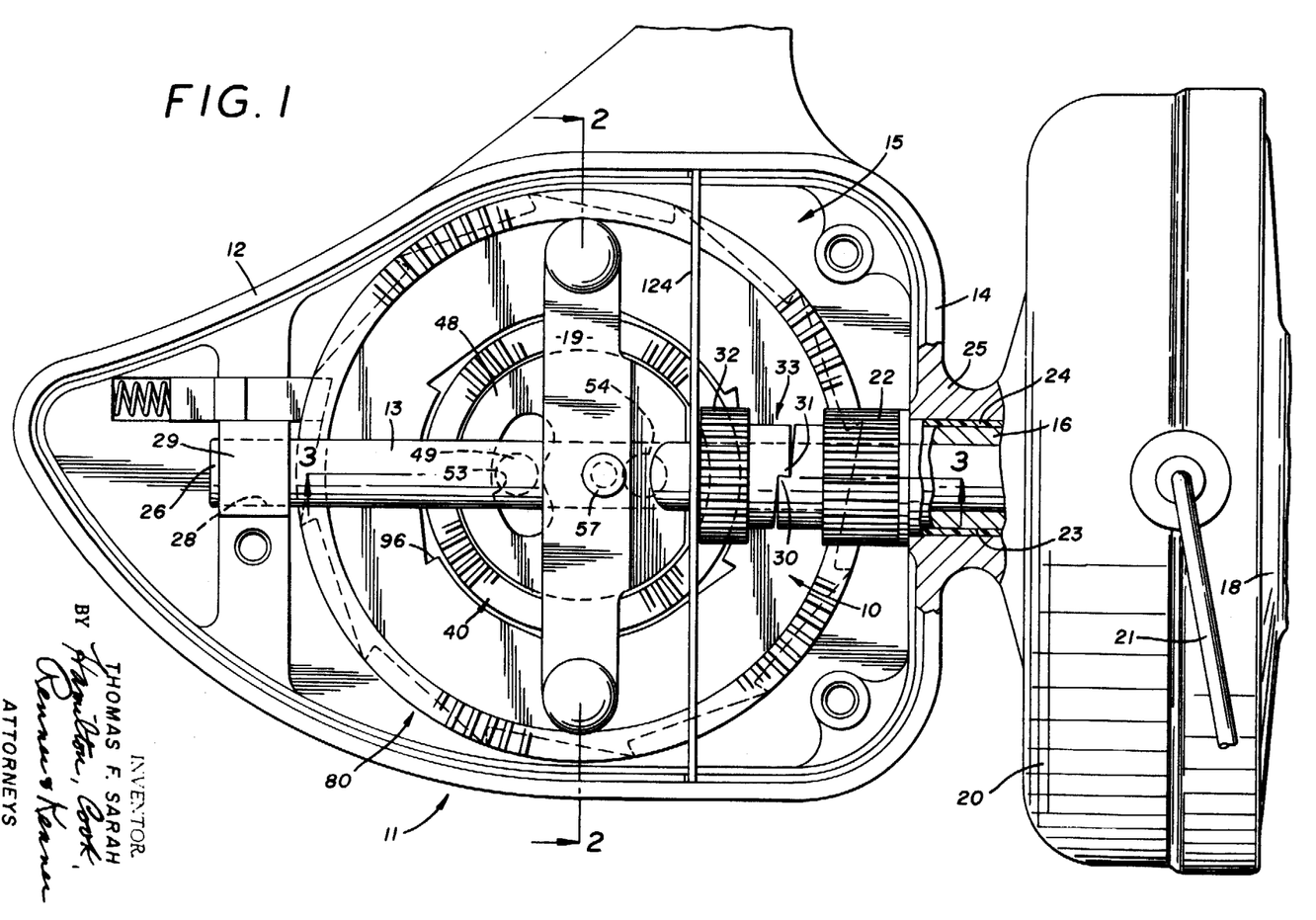
FIG. 1 is a partial side elevation of a spinning reel provided with a variable drive transmission embodying the concept of the present invention, the cover plate on the reel housing having been removed to reveal the mechanism within the gear compartment and the reel housing being partly broken away to reveal the relationship of the driven shaft to the pinions and the support beam.

Referring more particularly to the drawings, an improved variable drive, indicated generally by the numeral 10, is incorporated in an open face, spinning-type reel 11. The reel 11 has a housing 12 with a nonrotatable support beam 13 extending through the forward wall 14 from within the gear compartment 15.

A hollow, driven shaft 16 is rotatably mounted about that portion of the support beam 13 extending through the forward wall 14 of the housing 12, and forwardly of the driven shaft 16 a line spool 18 is rotatably mounted on the support beam 13. Rotation of the line spool 18 with respect to the support beam 13, however, is restricted by a drag mechanism at the front of the line spool, not shown, as is well known to the art. Interiorly of a gear compartment 15 the support beam may be secured to a traverse block 19 that is reciprocated to effect a level wind of the line during retrieval, the means by which retrieval is effected being hereinafter more fully described.

A flyer 20, carrying the customary bail mechanism 21, is secured to the driven shaft 16 for rotation therewith exteriorly of the housing 12 and in proximity to the forward wall 14. A first pinion 22 is rotatably mounted on the support beam 13, is secured to the driven shaft 16 and is located interiorly of the gear compartment 15 for rotation with the driven shaft 16; in fact, the first pinion 22 may even be formed integrally with the driven shaft 16, as shown. To stabilize the driven shaft 16 as well as the flyer 20 and pinion 22 secured thereto, the cylindrical exterior surface 23 of the driven shaft 16 is rotatably journaled in a sleeve bearing 24 secured within a boss 25 provided on the forward wall 14 of the housing 12. Stability may be further enhanced if the rearward end portion 26 of the support beam 13 is reciprocatingly slidable in a stabilizing way 28 formed in a boss 29 at the rear of the gear compartment 15.

A first pawl means 30 extends axially rearwardly from the first pinion 22 for cooperative interengagement with a second pawl means 31 extending axially forwardly from a second pinion 32 that is rotatably and slidably supported on the support beam 13. The first and second pawl means form a unidirectional clutch 33 that operates in the same fashion as set forth in the aforesaid application, Ser. No. 016,761.

Figure 2:
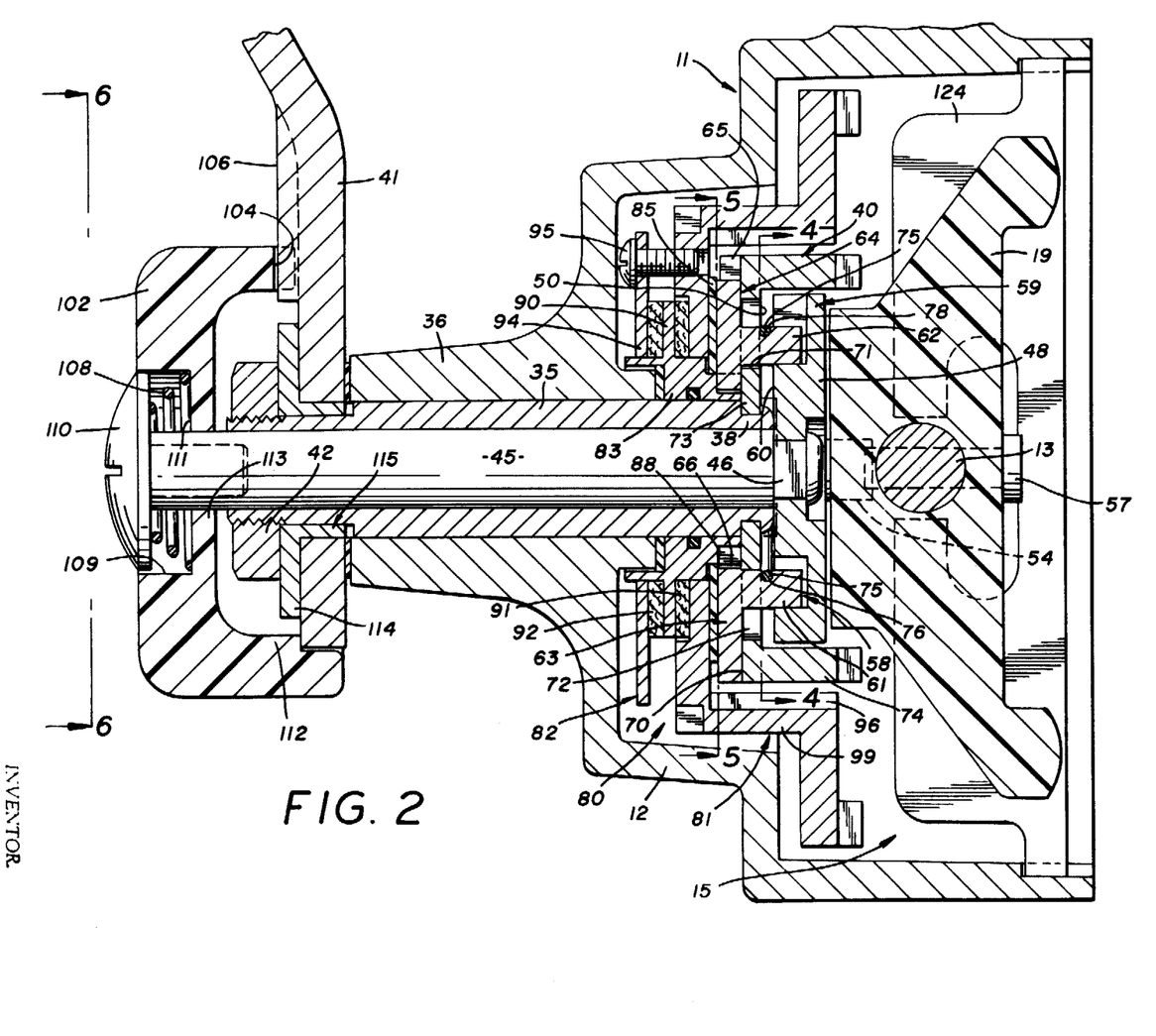
FIG. 2 is a slightly enlarged vertical section taken substantially on line 2—2 of FIG. 1 depicting those components primarily associated with the driving shaft.

As best seen in FIG. 2, a hollow, driving shaft 35 is rotatably mounted within a hub 36 on housing 12 and is oriented generally transversely of the support beam 13. That portion of the driving shaft 35 that extends into the gear compartment 15 terminates in a shank 38 to which a second, or low speed, driving gear 40 is secured for rotation with, but not with respect to, the driving shaft 35. That portion of the driving shaft 35 that extends exteriorly of the hub 36 and oppositely of the gear compartment 15 is flatted and threaded to receive a crank 41 by which rotation of the driving shaft 35 can be effected. A nut 42 demountably secures the crank 41 to the driving shaft 35.

A selector shaft 45 extends coaxially within the hollow driving shaft 35 and is rotatable with and, selectively, with respect to, the driving shaft 35. A shank portion 46 on the selector shaft 45 extends axially beyond the driving shaft 35 and into the gear compartment 15 where it carries a cam plate 48. A locating stud 49 (FIGS. 3 and 4) extends outwardly from the obverse face 50 on the web portion 51 of the second driving gear 40 parallel to the rotational axis 52 thereof and is received within an arcuate slot 53 in the cam plate 48.

Figures 4, 5, 6:
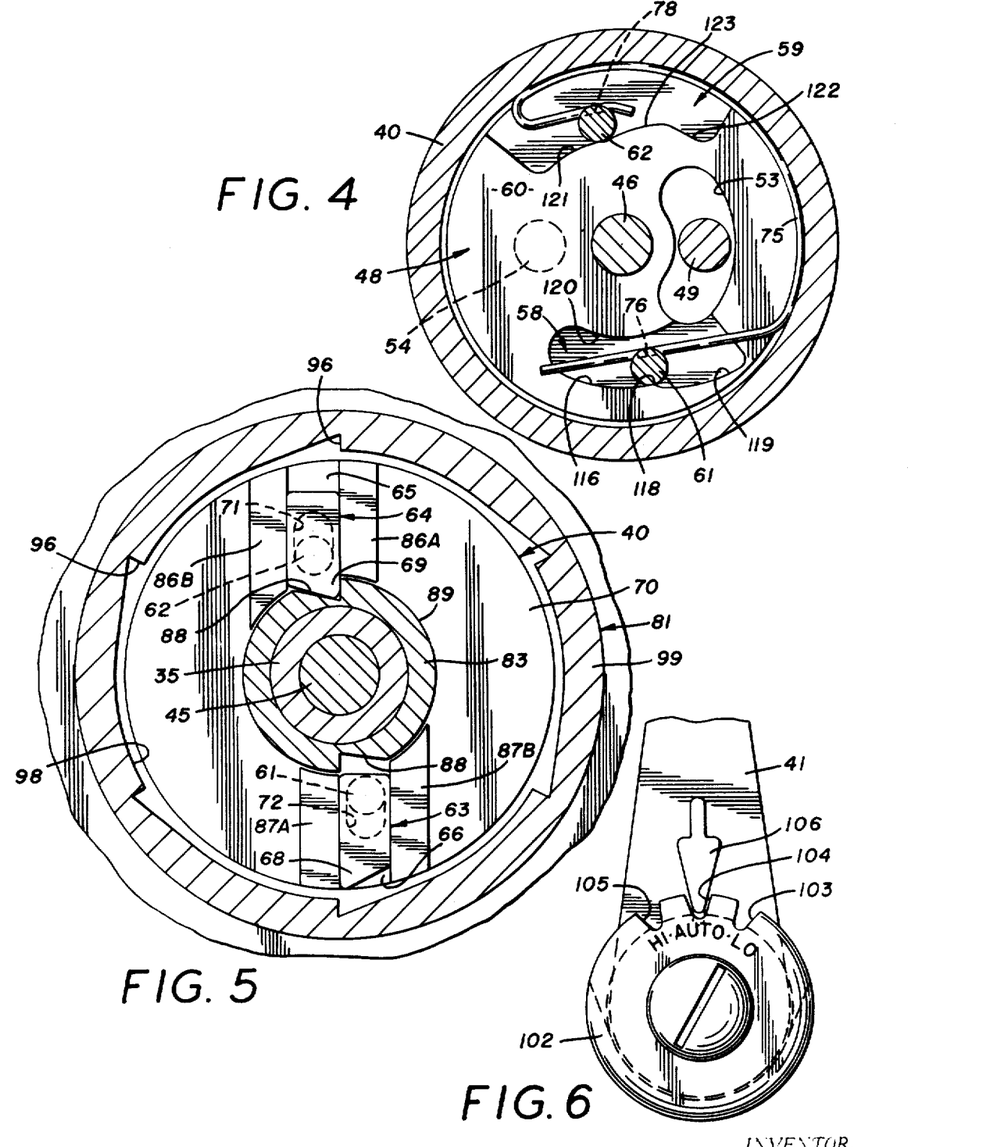
FIG. 4 is a cross section taken substantially on line 4—4 of FIG. 2 and depicting the cam plate in plan with the followers on the two latch means cooperatively engaging the cam walls along the sockets in the cam plate, the relative disposition depicted being such as to afford automatic selection of the transmission ratio in response to retrieval resistance.
FIG. 5 is a cross section taken substantially on line 5—5 of FIG. 2 and depicting the disposition of the two latch means when the cam plate is oriented as shown in FIG. 4.
FIG. 6 is a partial elevation taken substantially on line 6—6 of FIG. 2 and depicting the selector knob, the detents therein, and their relationship with the index marker on the crank.

A reciprocating stud 54, oriented parallel to the locating stud 49, extends outwardly from the obverse face 55 of cam plate 48 and, therefore, distal with respect to the second driving gear 40, rotatably to engage within a blind bore 56 in the traversing block 19. The interaction of the stud 54 and the blind bore 56 effects reciprocation of the traversing block 19, and thus the line spool 18, upon rotation of the driving shaft 35, because the traversing block 19 is, as customary, connected by a pin 57 to the support shaft 13 on which the line spool is carried.

A pair of camming sockets 58 and 59, as best seen in FIG. 4, are recessed within the reverse face 60 of the cam plate 48 and are engaged by followers 61 and 62 on the respective selecting latches 63 and 64 (FIG. 2) slidably receive in ways 65 and 66 on the second driving gear 40. Because the configuration of the sockets are individualized to accomplish the hereinafter described actuation of the latches 63 and 64, it is imperative that the followers be received in their proper sockets, and this is assured by engagement of the locating pin 49 within the slot 53. As is also hereinafter more fully described the cam plate 48 must be permitted a partial rotation with respect to the second driving gear 40 in order for the camming sockets 58 and 59 to control the disposition of the respective latches 63 and 64. For that reason the slot 53 must subtend at least an angle equal to the complete range through which the cam plate 48 must rotate with respect to the second driving gear 40. As best seen in FIGS. 2 and 5, the ways 65 and 66 in which the respective bolt portions 68 and 69 of each selecting latch 63 and 64 are slidably received are preferably provided on the reverse face 70 of the second driving gear 40. The followers 61 and 62 extend transversely of the respective bolt portions 68 and 69 and through slots 71 and 72 in the web portion 73 of the second driving gear 40 and into their respective camming sockets 58 and 59.

By using a crown construction for the second driving gear 40 the cylindrical toothed portion 74 is conjoined to the web portion 73 in a cup-like arrangement within which a spring 75 may be received to bias the first latch means 63 radially outwardly with respect to the second driving gear 40 on which it is carried and simultaneously to bias the second latch means 64 radially inwardly with respect to the second driving gear 40. In furtherance of this purpose spring 75 may be in the form of the wire and engage a notch 76 on the radially inner side of the follower 61 and also engage a notch 78 on the radially outer side of follower 62. By locating the notches 76 and 78 adjacent the plane of the obverse face 50 on the web portion 73 of the second driving gear, engagement of the wire spring 75 within the notches maintains the latches 63 and 64 slidably conjoined to the second driving gear 40, even during assembly or disassembly of the reel. The operation of the latch means in providing control over the retrieval speed afforded by the reel is more fully hereinafter described.

Figure 3:
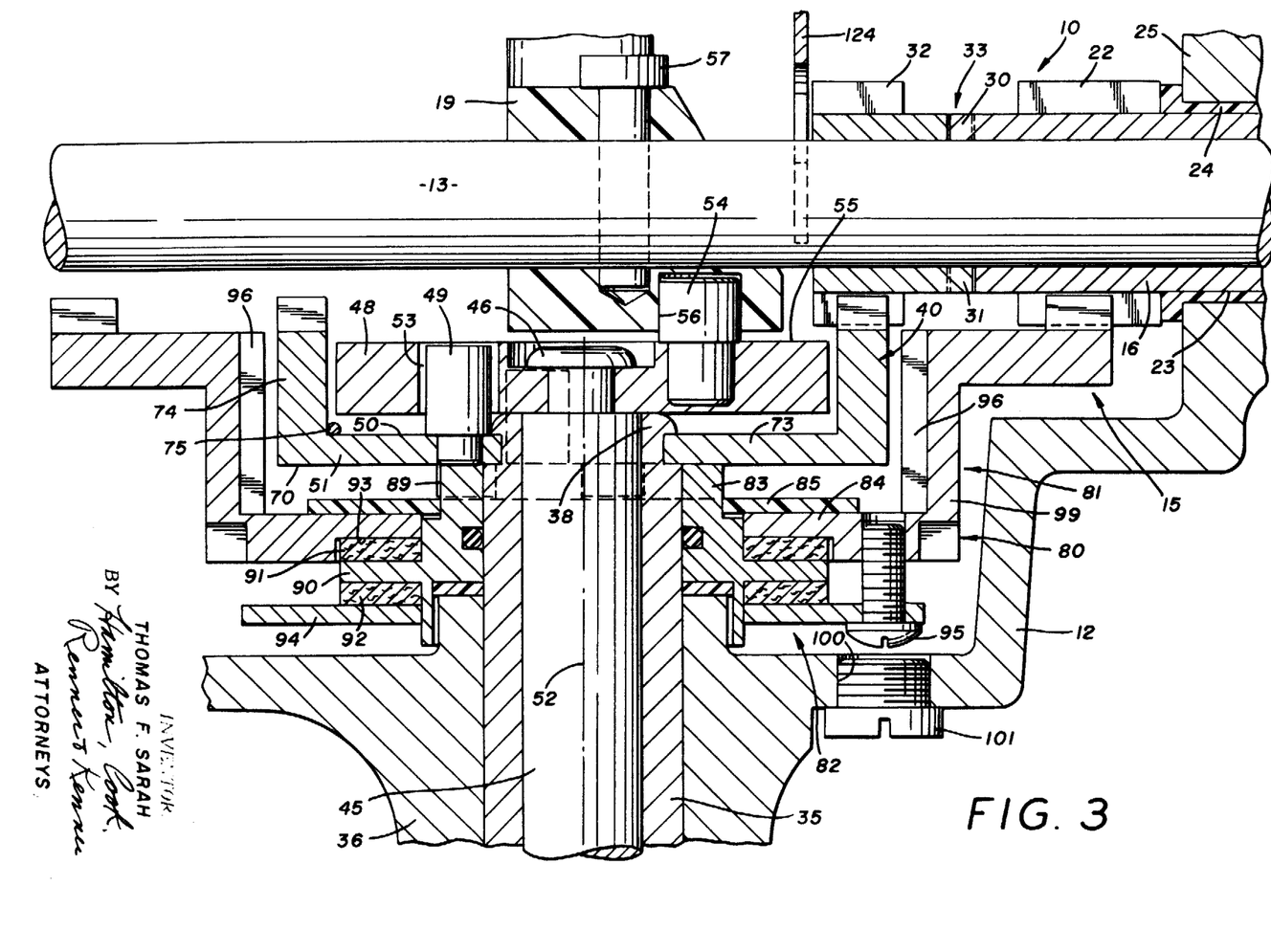
FIG. 3 is a further enlarged cross section taken substantially on line 3—3 of FIG. 1 and depicting the details of the slip-clutch coupler between the collar-like hub portion and the gear portion of the first driving gear assembly.

As seen in FIG. 2, and as detailed in FIG. 3, a first driving gear assembly 80 is also carried on the driving shaft 35. The first driving gear assembly comprises a first driving gear portion 81 and a slip-clutch coupler 88 that joins the gear portion 81 to a clutch collar 83 that comprises the hub of the first driving gear assembly 80. The clutch collar 83 is mounted on the driving shaft 35 for rotation with and with respect thereto. The web portion 84 of the driving gear 81 rotatably encircles the clutch collar 83 and is axially separated from the selecting latches 63 and 64 by a low friction, spacing washer 85. The clutch collar 83 extends axially along the driving shaft 35 and is rotatably received within the plane of the ways 65 and 66.

To this purpose the radially inner ends of the walls 86A and 86B (FIG. 5) which define the sides of the way 65 and the radially inner ends of the walls 87A and 87B defining the sides of the way 66 are relieved, as shown in FIG. 5, to permit the clutch collar 83 to extend to the reverse face 70 of the second driving gear 40. That portion of the clutch collar 83 that extends within the plane of the ways 65 and 66 is provided with one, or more, recessed catches 88 on the radially outer surface 89 of the clutch collar 83 into which the bolt portion 69 of the second latch 64 is biasingly urged by spring 75.

A clutch flange 90 (FIG. 3) extends radially from the collar 83 and is embraced by friction washers 91 and 92. The clutch flange 90 and the embracing friction washers 91 and 92 are, in turn, sandwiched between a clutch face 93 on the web portion 84 of the first driving gear 81 and a pressure plate 94 supported from the web portion of the first driving gear 81 by a plurality of adjusting screws 95.

The first driving gear portion 81 is also provided with a plurality of recessed catches 96 into which the bolt portion 68 of the first latch 63 is biasingly receivable. As best shown in FIG. 5, the catches 96 may be located in the radially inwardly directed surface 98 on the cylindrical extension 99 of the web portion 84.

Adjustment of the slip clutch assembly 82 can be accomplished with facility without disassembling the reel by providing at least one access bore 100 (FIG. 3) through the housing 12 and locating the access bore 100 so that the adjusting screws 95 can be aligned sequentially therewith and loosened or tightened as appropriate to the desired adjustment of the clutch assembly 82. A removable screw plug 101 is preferably provided as a closure for the access bore 100.

As explained in the "Objects of the Invention," a mechanism incorporating the concept of the present invention provides not only an automatic variation of the retrieval speed in response to the resistance offered against retrieval but also a manual override on the automatic variation to provide either a selected high speed or low speed retrieval.

At this point an explanation as to the operation of the mechanism heretofore described will facilitate a basic understanding of the invention, and that discussion shall begin with a description of the automatic operation.

Secured to the end of the selector shaft 45 extending beyond the driving shaft 35 and crank 41 exteriorly of the housing is a selector knob 102. The selector knob 102 is provided with three detents 103, 104, 105 (FIG. 6) that engage an index marker 106 on the crank 41. The detents are preferably marked, and, as shown: the detent 103 may be marked LO; the detent 104 may be marked AUTO; and, the detent 105 may be marked HI.

A compression spring 108 received within a counterbore 109 in the selector knob 102 applies a biasing pressure between the cap screw 110 by which the knob 102 is secured to the selector shaft 45 and the base 111 of the counterbore 109 to maintain the selected detent engaged with the index marker. In addition to maintaining a biasing engagement between the selected detent 103, 104 or 105 and the index marker 106, the spring 108 also assures the proper disposition of the cam plate 48 with respect to the second driving gear 40. In this respect to a step 112 (FIG. 2) along the radially inner periphery of the skirt 113 on knob 102 engages the crank 41 to constitute an anchor against which the biasing force of spring 108 can act in one direction. As such, the reaction force of spring 108 against cap screw 110 is transmitted through the selector shaft 45 to maintain the desired disposition of the cam plate 48 with respect to the drive gear 40; the gear 40 is secured against axial translation by tightening the nut 42 against the radial flange 114 of wear thimble 115.

In order to provide automatic operation, the selector knob is displaced axially against the biasing action of spring 108 and rotated until the detent 104 aligns with the index marker 106. Thereupon the selector knob 102 is released, and the interengagement of the index marker 106 with the detent 104 maintains the internal mechanism in the proper disposition to provide automatic operation.

Specifically, with the selector knob rotated to align the detent 104 with the index marker 106 the selector shaft 45 correspondingly turns the cam plate 48 so that the camming socket 58 engages the follower 61 to maintain the bolt portion 68 of the latch 63 disposed radially inwardly against the biasing action of spring 75 and out of engagement with any of the catches 96 on the first driving gear 81. In order to impart an assured understanding of the interaction between the follower 61 and socket 58, it should be appreciated that the socket 58 has a wall portion 116 arcuate about the rotational axis 52 of the selector shaft 45 with which the cam plate 48 rotates. An apex 118 is presented where the arcuate wall portion 116 intersects a second wall portion 119 that spirals radially outwardly away from the curve of the first wall portion 116. Because the wall portions 116 and 119, and thus the apex 118, define the radially outer side of socket 58, it is the engagement of the follower 61 against the arcuate wall portion 116, in proximity to the apex 118 (as shown in FIG. 4), that maintains the latch 63 positioned such that the bolt portion 68 thereof remains disengaged from any of the catches 96. The radially inner side 120 of the socket 58 performs no function in the embodiment disclosed and may, therefore, be of such configuration as is necessary to maintain it out of engagement with the follower 61.

At the same time, the camming socket 59 is disposed to permit the bolt portion 69 on latch 64 to engage the catch 88 on the clutch collar 83, in response to the biasing influence of the spring 75. In this regard the particular configuration of the socket 59 must also be thoroughly understood to comprehend not only the aspect of automatic retrieval speed selection in response to resistance but also the alternative options of selecting either a predetermined high speed or a predetermined low speed retrieval ratio. The socket 59 has two, circumferentially spaced wall portions 121 and 122 arcuate about the rotational axis 52 of the selector shaft 45. However, the radii of the two wall portions 121 and 122 differ in an amount at least equal to the throw of the bolt portion 69 on latch 64 necessary to move it between engagement and disengagement with any of the catches 88, the wall portion 121 being located radially inwardly with respect to wall portion 122. A transitional wall portion 123 spirals radially between the circumferentially spaced, proximate ends of wall portions 121 and 122. For automatic operation of reel 10 the spring 75 biases the follower 62 radially inwardly in proximity to wall portion 121 so that the bolt portion 69 will engage a catch 88. With the latch 64 — carried on the second driving gear 40 — engaging catch 88, as the crank turns driving shaft 35 the clutch collar 83 will be forced to rotate with the driving shaft 35.

It should be apparent from the interrelationship of the components heretofore disclosed that several other components will also rotate with the driving shaft 35 — to wit: the second driving gear 40; the selector shaft 45; and, the cam plate 48. As such, the radial disposition of the latches 63 and 64 with respect to their corresponding catches 96 and 88 is uneffected by rotation of the driving shaft 35.

To continue with an explanation of the automatic operation of the subject reel it must be assumed that the clutch assembly 82 has been adjusted to slip upon the application of that predetermined resistance to retrieval of the line at which a shift from high to low speed retrieval is desired. This adjustment should be made before beginning to fish and with the detent 104 engaging the index marker 106. The adjustment is effected with facility by tightening screws 95 in the event an increased resistance is required before the clutch assembly 82 slips or by loosening the screws 95 in the event a decreased resistance is required.

As the crank 41 is rotated to retrieve a lure against a resistance less than that at which the clutch assembly 82 would slip, the first driving gear portion 81 will rotate at the same angular velocity as the clutch collar 83. Because the gear ratio that exists between the first driving gear portion 81 and the first pinion 22 with which it is meshingly engaged is higher than the gear ratio that exists between the second driving gear 40 and the second pinion 32 with which it is meshingly engaged, during the time that the first driving gear portion 81 rotates at the same angular velocity as the clutch collar 83, the first pinion 22 will rotate faster than the second pinion 32 and the driven shaft 13 (and the flyer 20 secured thereto) will therefore be rotated to effect the high speed retrieval ratio. As the first pinion 22 thus overruns the second pinion 32 the relative rotation therebetween is accommodated by the unidirectional clutch 33 which may well be of the same type disclosed in my aforesaid copending application, Ser. No. 16,761. It should be appreciated that the resilient yoke 124 may be utilized yieldingly to urge the elements of the unidirectional clutch 33 toward engagement but that according to the present concept the yoke 124 does not affect the selectivity of the retrieval ratio.

However, once the resistance offered against retrieval of the lure, as by a fish, applies a torque loading between the first driving gear portion 81 and the clutch collar 83 that exceeds the frictional resistance offered by the clutch assembly, the first driving gear portion 81 will slip with respect to collar 83. Continued rotation of the driving shaft 35 to retrieve the line, though not affecting rotation of the first driving gear portion 81 will rotate the second driving gear 40 to turn the second pinion 32. When the second pinion 32 is thus rotated at an angular velocity greater than that of the first portion 22, the second pinion 32 will rotate the driven shaft 16 through the unidirectional clutch 33 to effect the low speed retrieval ratio.

Should the resistance offered against retrieval of the line exceed even the torque loading by which the customary drag mechanism secures the line spool 18 to the driven shaft 16, the line itself will turn the spool 18 in a direction which permits the line to exit irrespective of whether or not the driving shaft 35 is rotated. It is, therefore, highly desirable to have a click pawl (not shown) operative between the frame 12 and the line spool 18 in order to give the fisherman an audible signal that line is being withdrawn. In that way he will be made aware that continued useless turning of the driving shaft 35 will twist the line as it passes between the oppositely rotating line spool 18 and bail mechanism 21.

Conversely, should the resistance offered against retrieval of the line be reduced below the level at which the torque loading between the first driving gear portion 81 and the clutch collar 83 equals the frictional resistance offered by the clutch assembly 82, the high speed retrieval ratio will be resumed.

Figure 7:
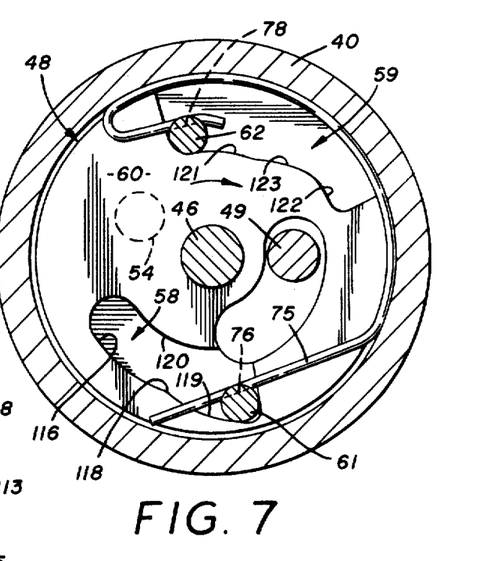
FIG. 7 is a view similar to FIG. 4 but depicting the relative disposition of the followers and cam walls necessary to effect selection of only the higher speed transmission ratio.

In the event the fisherman desires to select either a high or low speed retrieval ratio that will be maintained irrespective of the resistance offered against line retrieval, he translates the selector knob 102 against the biasing action of spring 108 to disengage the AUTO detent 104 from the index marker 106 and then rotates the knob 102 until the detent designating the desired retrieval ratio is aligned with the index marker 106. For example, assuming that the fisherman desires to maintain a high speed retrieval ratio, he will rotate the knob 102 to engage the index marker 106 with detent 105. This rotation of the knob 102 turns the cam plate 48 to release the follower 61 on latch 63 from the restraining effect of the cam socket 58. So released, the spring 75 will bias the latch 63 radially outwardly until the bolt portion 68 seats within the catch 96 on the first driving gear portion 81. That is, as the cam plate 48 rotates from the position shown in FIG. 4 to the position shown in FIG. 7 the follower 61 is permitted to move radially outwardly under the pressure applied by spring 75 to the extent controlled by the spiral wall portion 119 of socket 58. The curve of the spiral wall portion 119, therefore, is such that when the cam plate 48 has been rotated to select high speed retrieval (FIG. 7), the bolt portion 68 on latch 63 will be permitted to reach its outermost extent and engage one of the catches 96 in the radially inner surface 98 on the cylindrical extension 99 of the first driving gear portion 81. As such, the first driving gear portion 81 is constrained to rotate with the driving shaft 35 by its heretofore described connection to the second driving gear 40 which is itself rigidly secured to the driving shaft 35. The flyer 20 is thereby rotated in response to the first driving gear portion 81 and its meshing engagement with the first pinion 22 in the same fashion as the high speed retrieval ratio is effected when the reel is set for automatic operation.

It should be appreciated that the latch 64 plays no part in the operation of the reel during select high speed retrieval and can, therefore, be disposed in either the inner or outer position. For simplicity, then, the arcuate extend of surface 121 is preferably equivalent to the range of angular rotation required of the cam plate 48 as the selector knob 102 is turned to change the alignment of the index marker 106 from detent 104 to detent 105.

On the other hand, should the fisherman choose to maintain the low speed retrieval ratio, he would turn the selector knob 102 to engage the LO detent 103 with the index marker 106. Rotation of the knob 102 to align the detent 103 with the index marker 106 turns the cam plate 48 to the position depicted in FIG. 8. As such, the follower 61 is engaged by the arcuate surface 116 in camming socket 58 to maintain the bolt portion 68 of latch 63 disengaged from the catch 96 on the first, or high speed, driving gear portion 81. This is the same position required of the latch 63 to effect automatic selection of the retrieval speed so that the arcuate extent of surface 116 should preferably be equivalent to the range of angular rotation required of the cam plate 48 as the selector knob 102 is turned to change the alignment of index marker 106 from detent 104 to detent 103.

Figure 8:
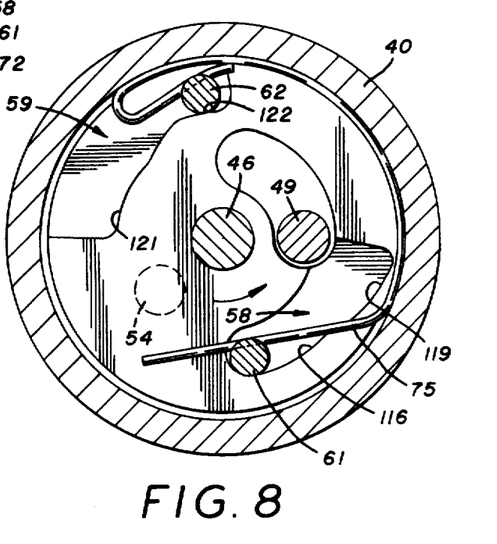
FIG. 8 is a view similar to FIGS. 4 and 7 but depicting the relative disposition of the followers and cam walls necessary to effect selection of only the lower speed transmission ratio; and, FIG. 9 is a cross section similar to FIG. 3, but of reduced scale, and being directed to an alternative embodiment by which only manual shifting of the transmission ratios is possible.

As the cam plate 48 is turned from the FIG. 4 to the FIG. 8 position, the transitional wall portion 123 and the arcuate wall portion 122 of cam socket 59 sequentially engage the follower 62 to shift the latch 64 to the radially outer position whereby the bolt portion 69 thereof is maintained disengaged from the catch 88 on the clutch collar 83. As such, all driving connection between the driving shaft 35 and the first driving gear assembly 80 are completely severed so that rotation of the driving shaft 35 by crank 41 rotates only the second driving gear 80. The second driving gear 80 rotates the driven shaft 16 to effect low speed retrieval by virtue of the second pinion 32 and the unidirectional clutch 33 which comprise the drive train operative between the second driving gear 80 and the driven shaft 16.

Figure 9:
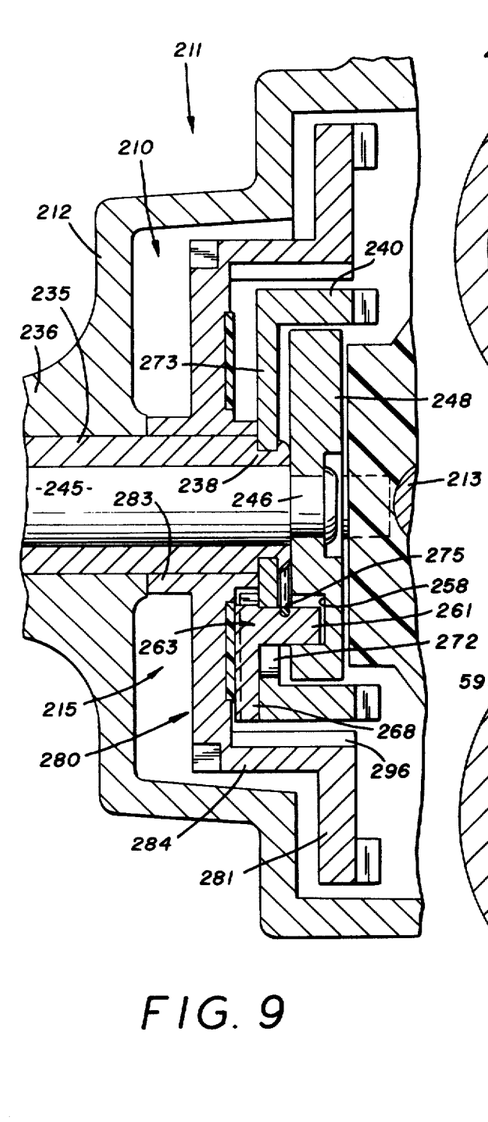

The concept of the present invention is also readily adaptable to provide a construction in which high or low speed retrieval ratios may only be manually selected. That is, the feature of automatic selection in response to resistance may be wholly eliminated and the fisherman afforded only manual selection of the retrieval ratio desired. An alternative drive 210 adapted only for manual selection of the transmission ratios may employ a varied construction for the first drive gear assembly 280, as shown in FIG. 9.

The gear portion 281, web portion 284 and the hub portion 283 may all be integrally joined together, with the unitary hub portion 283 being rotatably mounted on the driving shaft 235.

The hollow driving shaft 235 is rotatably mounted within a hub 236 on the housing 212 of this alternative form of reel 211 and is also oriented generally transversely of support beam 213. The second driving gear 240 is secured for rotation with, but not with respect to, the shank portion 238 of the driving shaft 235 within the gear compartment 215.

The selector shaft 245 extends coaxially within the hollow driving shaft 235 and is rotatably with, and, selectively, with respect to, the driving shaft 235. A cam plate 248 is carried on the shank portion 246 of the selector shaft 245 that extends axially beyond the driving shaft 235 and into the gear compartment 215.

Because the first driving gear assembly 280 is unitary, the second driving gear 240 need only carry a simple latch means 263, the follower 261 thereon extending through a slot 272 in the web portion 273 of the second drive gear 240 and into a socket 258 in cam plate 248. Socket 258 may have a configuration identical to that of socket 58 in the cam plate 48, and socket 258 is, in fact, the only socket required for wholly manual selection between a high or a low speed retrieval ratio. Accordingly, the cam plate 248 need only be selectively movable between two positions by a knob, not shown, but similar to knob 102 in FIG. 6 (a knob suitable for the alternative drive 210 need only have detents corresponding to the detents 103 and 105 provided in knob 102).

When the cam plate 248 is positioned as shown in FIG. 9, the socket 258 coacts with the follower 261 to maintain the latch 263 disengaged from the first driving gear 280. As such, the socket 258 and follower 261 are disposed identically to the disposition of the socket 58 and follower 61 depicted in FIG. 8. Thus, the first driving gear 280 is free to rotate with respect to the driving shaft 235 so that rotation of the latter effects slow retrieval by virtue of the driving rotation of the second driving gear 240 in exactly the same fashion as explained in conjunction with the low speed retrieval for drive 10.

When the cam plate 248 is turned so that the socket 258 permits the action of spring 275 to move the latch 263 to its outermost position, the bolt portion 268 thereon engages a catch 296 in the web portion 284 of the first driving gear 280 so that as the driving shaft 235 is rotated, the first driving gear 280 is rotated therewith to effect high speed retrieval in exactly the same fashion as explained in conjunction with drive 10.

It should now be apparent that a variable drive transmission embodying the concept of the present invention permits the user of the reel to shift manually between two transmission ratios either before beginning to use the reel, or during use thereof, with equal facility. If desired, such a drive may readily incorporate a means to permit automatic shift selection in response to a predetermined, adjustable retrieval resistance.

What is claimed is:

1. A variable drive to provide first and second transmission ratios for a fishing reel comprising, a driving shaft, first and second driving gear means carried on said driving shaft, said first driving gear means being a part of a gear train of the first transmission ratio and said second driving gear means being a part of a gear train of the second transmission ratio, said first driving gear means being rotatable with respect to said driving shaft, said second driving gear means secured to rotate with said driving shaft, first latch means selectively to effect a driving connection between said first and second driving gear means, a driven shaft, a first pinion operatively connected to said driven shaft to be rotatable therewith and meshingly engaging said first driving gear means, a second pinion mounted to move with respect to said driven shaft, said second pinion meshingly engaging said second driving gear means, and a clutch means interconnecting said first and second pinion for unidirectional drive.

2. A variable drive, as set forth in claim 1, in which the first latch means is shifted to engage with, and is shifted to disengage from, said first driving gear means to select the transmission ratio, and in which cam means effect at least one said shift.

3. A variable drive, as set forth in claim 2, in which spring means bias said first latch means against said cam means.

4. A variable drive, as set forth in claim 2, in which a selector rod having opposed ends is coaxially mounted within said driving shaft, a knob means is secured to one end of said selector rod exteriorly of said reel, and a cam means is secured to the other end of said selector rod interiorly of said reel to control the shifting of said latch means.

5. A variable drive, as set forth in claim 4, in which said cam means is a plate having cam walls and said latch means has follower means, spring means bias said follower means against said cam walls such that selective rotation of said cam plate effects the desired shifting of said latch means.

6. A variable drive, as set forth in claim 1, in which said first gear means comprises a collar portion rotatably carried on said driving shaft, a gear portion meshingly engaged with said first pinion and a coupling means operatively connecting said gear portion to said collar portion to permit said gear portion to slip rotatably with respect to said collar portion in response to a predetermined torque loading, and in which second latch means selectively effect a driving connection between said second driving gear and said collar portion.

7. A variable drive, as set forth in claim 6, in which a selector rod having opposed ends is coaxially mounted within said driving shaft, a knob means being secured to one end of said selector rod exteriorly of said reel, a cam means secured to the other end of said selector rod interiorly of said reel, first and second cam walls provided on said cam means to control the respective shifting of said first and second latch means.

8. A variable drive, as set forth in claim 7, in which the orientation of said cam walls permits the selection of at least three combinations for the disposition of said first and second latch means selectively to determine either a fixed first transmission ratio, a fixed second transmission ratio or an automatic selection between said first and second transmission ratios in response to the torque loading across said coupling means.

9. A variable drive, as set forth in claim 8, in which said coupling means is a slip-clutch and in which means are provided to adjust said clutch so that it will slip at a predetermined torque loading.

10. A variable drive, as set forth in claim 9, in which said latch means are both carried on said second driving gear, said first latch means selectively engageable with the gear portion of said first gear means, said second latch means selectively engageable with the collar portion of said first gear means.

11. A variable drive, as set forth in claim 10, in which spring means bias both said first latch means toward engagement with said gear portion and said second latch means toward engagement with said collar portion.

12. A variable drive, as set forth in claim 11, in which said cam plate has first and second sockets, a follower on said first latch means extends within said first socket and a follower on said second latch means extends within said second socket, each said socket having wall portions to override the biasing action of said spring means and control the disposition of said first and second latch means.

13. A variable drive, as set forth in claim 12, in which locator means interact between said cam plate and said second driving gear to assure the disposition of each said follower in the proper socket.

14. A variable drive, as set forth in claim 12, in which a crank is secured to said driving shaft exteriorly of the reel and a knob means on said selector rod is located adjacent said crank, an index marker on said crank coacts with detents on said knob means to delineate the orientations of the cam plate which effect the disposition of said first and second latch means to provide the selected transmission ratio.

15. A variable drive, as set forth in claim 14, in which the knob means is secured to said selector rod by a resilient mounting means, said detents are circumferentially spaced along said knob means, and said resilient mounting means biases said detents into engagement with said index marker and permits said knob means to be selectively translated with respect to said selector rod for disengaging the index marker from said detents and for permitting rotation of said selector rod with respect to said driving shaft selectively to position said cam plate.

* * * * *